(12) United States Patent
Wu et al.

(10) Patent No.: US 11,686,962 B2
(45) Date of Patent: Jun. 27, 2023

(54) DISPLAY PANEL, DISPLAY DEVICE AND PREPARATION METHOD FOR DISPLAY PANEL

(71) Applicant: BOE Technology Group Co., Ltd., Beijing (CN)

(72) Inventors: Zhongbao Wu, Beijing (CN); Chuandong Liao, Beijing (CN); Ruoyu Ma, Beijing (CN); Haiwei Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 47 days.

(21) Appl. No.: 17/288,535

(22) PCT Filed: Aug. 20, 2020

(86) PCT No.: PCT/CN2020/112617
§ 371 (c)(1),
(2) Date: Apr. 25, 2021

(87) PCT Pub. No.: WO2021/057398
PCT Pub. Date: Apr. 1, 2021

(65) Prior Publication Data
US 2022/0011624 A1 Jan. 13, 2022

(30) Foreign Application Priority Data
Sep. 27, 2019 (CN) .......................... 201910922749.4

(51) Int. Cl.
*G02F 1/1333* (2006.01)
*G09F 9/30* (2006.01)

(52) U.S. Cl.
CPC .. *G02F 1/133325* (2021.01); *G02F 1/133314* (2021.01); *G09F 9/301* (2013.01)

(58) Field of Classification Search
CPC ......... G02F 1/133325; G02F 1/133314; G02F 2202/28; G02F 1/133308; G02F 1/13452; G09F 9/301; G09F 9/33
See application file for complete search history.

(56) References Cited

U.S. PATENT DOCUMENTS

2015/0160760 A1* 6/2015 Sato ...................... G06F 1/1626
345/174
2016/0187686 A1 6/2016 Lou et al.
(Continued)

FOREIGN PATENT DOCUMENTS

| CN | 107864552 A | 3/2018 |
| CN | 108089382 A | 5/2018 |

(Continued)

OTHER PUBLICATIONS

International Search Report for PCT/CN2020/112617 dated Dec. 7, 2020.
(Continued)

*Primary Examiner* — Michael H Caley
*Assistant Examiner* — Agnes Dobrowolski
(74) *Attorney, Agent, or Firm* — Ling Wu; Stephen Yang; Ling and Yang Intellectual Property (57) ABSTRACT

A display panel, a display device and a preparation method for a display panel. The display panel includes a first substrate; a conductive structure layer is formed on a side surface of the first substrate, and the conductive structure layer is provided with a binding region close to a side edge thereof; the binding region of the conductive structure layer protrudes from a first end surface of the first substrate, and a protruding part of the conductive structure layer forms a first protruding portion; the first protruding portion bends toward a side of the first substrate away from the conductive structure layer; and a turning portion of the first protruding portion is fixed on the first end surface of the first substrate.

(Continued)

The binding region of the conductive structure layer is located at a bending part of the conductive structure layer and is not carried on the first substrate.

8 Claims, 9 Drawing Sheets

(56) References Cited

U.S. PATENT DOCUMENTS

| | | | |
|---|---|---|---|
| 2016/0209582 A1* | 7/2016 | Kawata | G02F 1/13452 |
| 2018/0196300 A1 | 7/2018 | Jung et al. | |
| 2019/0139905 A1 | 5/2019 | Cheng et al. | |
| 2020/0142241 A1 | 5/2020 | Jing | |
| 2020/0214137 A1 | 7/2020 | Huang et al. | |
| 2020/0271977 A1 | 8/2020 | Chen et al. | |
| 2021/0124202 A1* | 4/2021 | Pan | G02F 1/1333 |

FOREIGN PATENT DOCUMENTS

| | | |
|---|---|---|
| CN | 207799301 U | 8/2018 |
| CN | 108535907 A | 9/2018 |
| CN | 108681123 A | 10/2018 |
| CN | 108957812 A | 12/2018 |
| CN | 109541834 A | 3/2019 |
| CN | 110658656 A | 1/2020 |
| JP | 9-189919 A | 7/1997 |
| JP | 2001-223445 A | 8/2001 |

OTHER PUBLICATIONS

Office Action dated Feb. 2, 2021 for Chinese Patent Application No. 201910922749.4 and English Translation.

Office Action dated Jul. 26, 2021 for Chinese Patent Application No. 201910922749.4 and English Translation.

* cited by examiner

DISPLAY PANEL, DISPLAY DEVICE AND PREPARATION METHOD FOR DISPLAY PANEL

CROSS-REFERENCE TO RELATED APPLICATIONS

The present application is a U.S. National Phase Entry of International Application No. PCT/CN2020/112617 having an international filing date of Aug. 31, 2020 which claims priority of Chinese Patent Application No. 201910922749.4 filed to the CNIPA on Sep. 27, 2019, entitled "Display Panel, Display Device and Preparation Method for Display Panel". The contents of the above-identified applications should be construed as being hereby incorporated by reference.

TECHNICAL FIELD

Embodiments of the present application relate to, but are not limited to, the technical field of display apparatuses, and in particular to a display panel, a display apparatus, and a method for manufacturing the display panel.

BACKGROUND

Some display panels include an array substrate and a color film substrate which are oppositely disposed. A bonding region electrically connected with an external circuit board is disposed at an edge on a side of the array substrate.

In some technologies, whether COF (chip on flex) technology or COG (chip on glass, i.e., the chip is directly bonded to a glass substrate) technology is adopted, a bezel of the display panel on the external circuit board side cannot be as narrow as other side bezels, this is because edge alignment of the array substrate with the color film substrate can be achieved on the non-external circuit board sides of the display panel. However, on the external circuit board side of the display panel, because the array substrate is provided with bare metal wires (bonding region) which need to be electrically connected with the external circuit board, the edge alignment of the array substrate with the color film substrate cannot be achieved. Therefore, when the other side bezels of the display panel are made extremely narrow, the bezel on the external circuit board side of the display panel is still relatively wide.

SUMMARY

The following is a summary of subject matter described in detail herein. This summary is not intended to limit the protection scope of the claims.

An embodiment of the present application provides a display panel, which includes a first substrate, wherein a conductive structure layer is formed on a side surface of the first substrate, the conductive structure layer has a bonding region close to a side edge of the conductive structure layer, the bonding region of the conductive structure layer protrudes from a first end surface of the first substrate, a protruding part of the conductive structure layer forms a first protruding part, the first protruding part is bent toward a side of the first substrate away from the conductive structure layer, and a bent part of the first protruding part is fixed on the first end surface of the first substrate.

An embodiment of the present application further provides a display apparatus, which includes the display panel above and a backplate assembly disposed on the side surface of the first substrate away from the conductive structure layer, wherein the first protruding part is fixed on an end surface of the backplate assembly corresponding to the first end surface of the first substrate after being bent.

An embodiment of the present application further provides a method for manufacturing a display panel, including:

forming a conductive structure layer on a side surface of a first substrate, wherein the conductive structure layer has a bonding region close to a side edge of the conductive structure layer;

stripping at least a part of the bonding region from the first substrate;

cutting off a part of the first substrate stripped from the conductive structure layer, and making a stripped part of the conductive structure layer protrude from a cut end surface of the first substrate; and bending the stripped part of the conductive structure layer toward a side of the first substrate away from the conductive structure layer, and fixing a bent part of the conductive structure layer on the cut end surface of the first substrate.

Other aspects will become apparent upon reading and understanding accompanying drawings and the detailed description.

BRIEF DESCRIPTION OF DRAWINGS

The accompanying drawings are used to provide an understanding of embodiments of the present application, form a part of the specification, and are used to explain technical solutions of the embodiments of the present application together with embodiments of the present application, and do not constitute a limitation on the technical solutions of the embodiments of the present application.

The Reference Numerals are:

100 display panel, 110 second polarizer, 120 second substrate, 121 black matrix, 130 first substrate, 140 conductive structure layer, 1401 bonding region of conductive structure layer, 1402 bent part of conductive structure layer, 141 base layer, 142 conductive layer, 143 protective layer, 150 second fixing adhesive, 160 first fixing adhesive, 170 first polarizer;

200 backplate assembly, 210 adhesive bezel, 220 light shielding tape, 230 light strip, 231 light plate, 232 light emitting chip, 233 flexible printed circuit board, 240 heat conductive tape, 250 backplate, 260 double-sided tape, 270 reflective sheet, 280 light guide plate, 290 optical film;

300 insulating double-sided tape, 400 driving chip, 500 external circuit board;

122 stripped part of second substrate, 1221 lower surface of stripped part of second substrate, 131 stripped part of first substrate, 1311 upper surface of stripped part of first substrate, 600 auxiliary fixture, 610 adsorption surface, 620 limiting surface, 1000 auxiliary fixture, 1001 adsorption surface, 1002 limiting surface;

700 first mold, 710 molding surface of first mold, 720 limiting surface of first mold, 151 second fixing adhesive, 161 first fixing adhesive, 800 second mold, 810 molding surface of second mold, 820 limiting surface of second mold, 152 second fixing adhesive, 162 first fixing adhesive, 900 third mold, 910 molding surface of third mold, 920 limiting surface of third mold, 153 second fixing adhesive, 163 first fixing adhesive.

DETAILED DESCRIPTION

Those ordinary skilled in the art should understand that technical solutions of the present application may be modified or replaced equally without departing from the spirit and the scope of the technical solutions of the present application, which should be covered by the scope of the claims of the present application.

Figure 2:
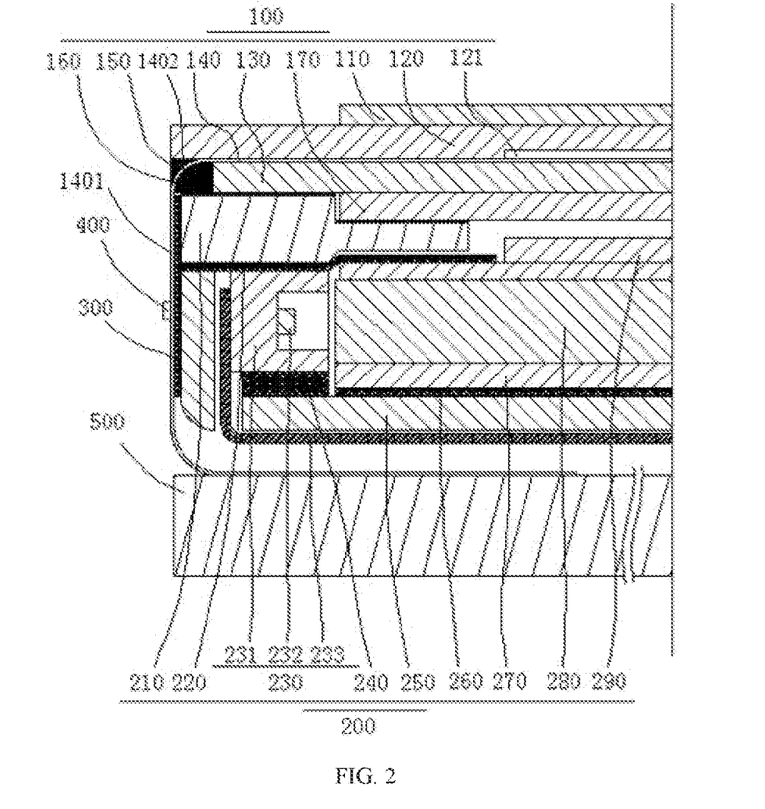
FIG. 2 is a schematic diagram of a cross-sectional structure of a display apparatus according to some exemplary embodiments.

As shown in FIG. 2, an embodiment of the present application provides a display panel 100, which includes a first substrate 130, a conductive structure layer 140 is formed on a side surface (an upper surface of the first substrate 130 in FIG. 2) of the first substrate 130, wherein the conductive structure layer 140 has a bonding region 1401 close to a side edge thereof. The bonding region 1401 of the conductive structure layer 140 protrudes from a first end surface of the first substrate 130, and a protruding part of the conductive structure layer 140 forms a first protruding part which is bent toward a side (a side surface where a lower surface of the first substrate 130 is located in FIG. 2) of the first substrate 130 away from the conductive structure layer 140, and a bent part 1402 of the first protruding part is fixed on the first end surface of the first substrate 130.

Herein, the side surface of the first substrate 130 away from the conductive structure layer 140 is the back side or back surface of the first substrate 130.

Figure 1:
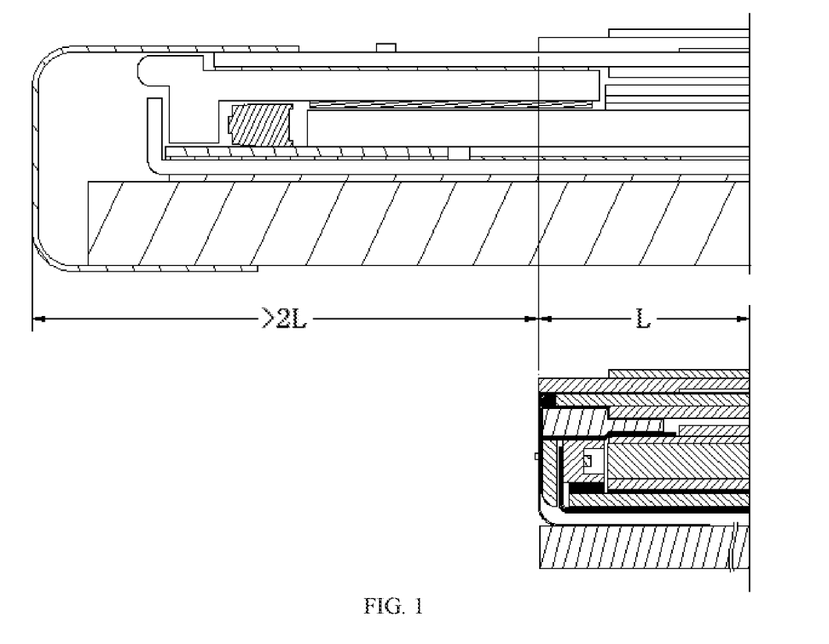
FIG. 1 is a schematic diagram showing a comparison between a display apparatus according to an embodiment of the present application and a display apparatus according to some technologies.

Referring to FIG. 2, in the display panel 100 of the embodiment of the present application, the bonding region 1401 of the conductive structure layer 140 protrudes from the first end face of the first substrate 130, and the protruding part of the conductive structure layer 140 forms the first protruding part, which is bent toward the side (the side where the lower surface of the first substrate 130 is located in FIG. 2) of the first substrate 130 away from the conductive structure layer 140. In this way, the bonding region 1401 of the conductive structure layer 140 is located at a bent part (i.e., the first protruding part) of the conductive structure layer 140 instead of being carried on the first substrate 130, which prevents the first substrate 130 from retaining a wide bezel area on the side surface where the first end face is located for carrying the bonding region 1401 of the conductive structure layer 140, thereby narrowing the bezel area of the first substrate 130 and the bezel of the display panel. Referring to FIG. 1, compared with some display apparatuses, a bezel width of the display apparatus using the display panel according to the embodiment of the present application is reduced to less than ⅓, and the bezel width of the display apparatus using the display panel according to the embodiment of the present application is significantly narrower than that of some display apparatuses.

Figure 3:
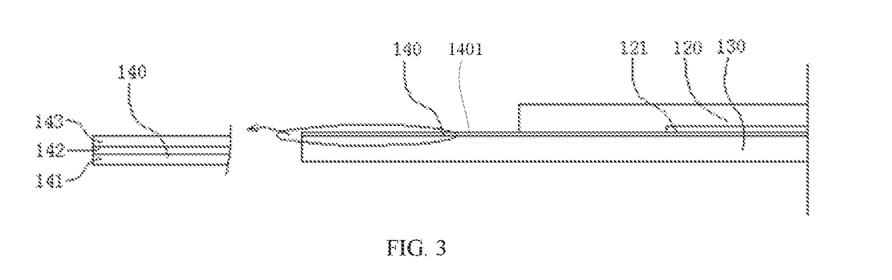
FIG. 3 is a schematic structural diagram of a display panel motherboard and a schematic structural diagram of a conductive structure layer on the display panel motherboard in a method for manufacturing the display panel according to some exemplary embodiments.

FIG. 3 is one of the process flow charts for manufacturing a display panel according to the embodiment of the present application. In some exemplary embodiments, as shown in FIG. 3, the conductive structure layer 140 may include a base layer 141, a conductive layer 142, and a protective layer 143 which are sequentially stacked, and materials of the base layer 141 and the protective layer 143 both include an organic material. The conductive layer 142 is a metal layer.

Organic materials are used for the base layer 141 and the protective layer 143 to ensure that the whole conductive structure layer 140 is flexible and bendable. The materials of the base layer 141 and the protective layer 143 may be organic materials such as polyimide (PI) and polyethylene terephthalate (PET).

Figure 9:
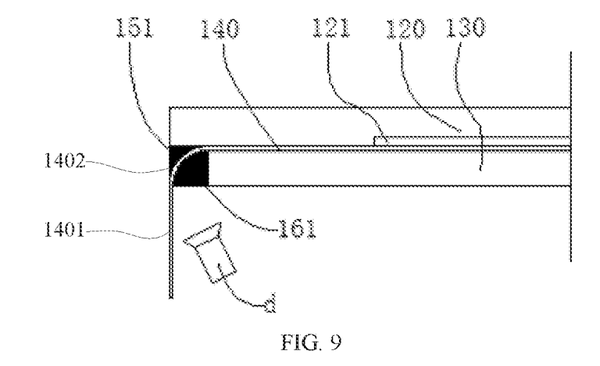
FIG. 9 is a schematic diagram showing a process of filling a first fixing adhesive after removing the first mold in FIG. 8 according to some exemplary embodiments.
Figure 12:
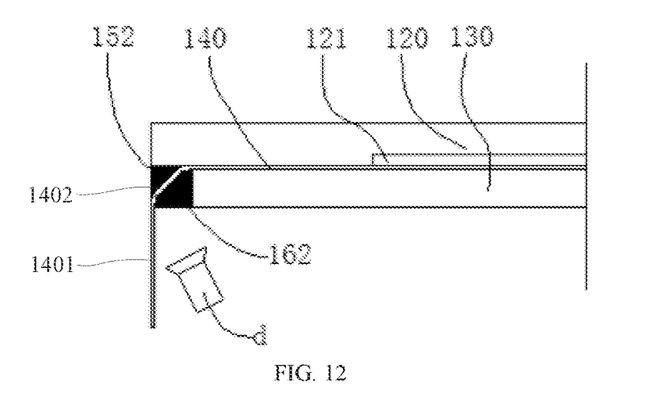
FIG. 12 is a schematic diagram showing a process of filling a first fixing adhesive after removing the second mold in FIG. 11 according to some exemplary embodiments.
Figure 15:
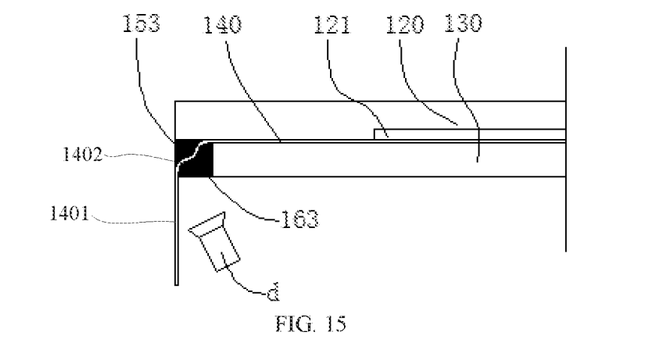
FIG. 15 is a schematic diagram showing a process of filling a first fixing adhesive after removing the third mold in FIG. 14 according to some exemplary embodiments.

FIG. 9, FIG. 12 and FIG. 15 are three embodiments of one of the process flow charts for manufacturing the display panel according to an embodiment of the present application. In some exemplary embodiments, referring to FIG. 9, FIG. 12 and FIG. 15, a bent part (i.e., a bent part of the first protruding part) 1402 of the conductive structure layer 140 bent toward the side of the first substrate 130 away from the conductive structure layer 140 has a smooth transition. A turning angle of the conductive structure layer 140 bent toward the side of the first substrate 130 away from the conductive structure layer 140 may be 90 degrees. The bent part 1402 of the conductive structure layer 140 has a smooth transition, which is beneficial to reducing deformation stress of the conductive layer 142 inside the conductive structure layer 140, thereby improving the life of the conductive structure layer 140.

In some exemplary embodiments, referring to FIG. 9, FIG. 12 and FIG. 15, a shape of the bent part 1402 of the conductive structure layer 140 may be an arc surface, a wavy curved surface, or a curved surface including an arc surface, an inclined surface and an arc surface which are sequentially connected. The arc surface may be a circular arc surface, an elliptical arc surface, etc. The wavy curved surface is beneficial to the smooth transition of the conductive structure layer 140, and can effectively increase a length of the bent part 1402 of the conductive structure layer 140, which is more beneficial to reducing the deformation stress of the conductive layer 142 inside the conductive structure layer 140, thereby improving the life of the conductive structure layer 140.

In some exemplary embodiments, referring to FIG. 2, a first fixing adhesive 160 is filled between the bent part 1402 of the conductive structure layer 140 and the first end face of the first substrate 130 to fix the bent part 1402 of the conductive structure layer 140 on the first substrate 130. The first fixing adhesive 160 may be UV adhesive (ultraviolet curing adhesive), wherein the UV adhesive may be filled between the bent part 1402 of the conductive structure layer 140 and the first end face of the first substrate 130 after the conductive structure layer 140 is bent, and then cured by a UV lamp (ultraviolet lamp), thereby one side surface of the bent part 1402 of the conductive structure layer 140 facing the first substrate 130 is fixed on the first end surface of the first substrate 130, to shape and protect the bent part 1402 of the conductive structure layer 140.

In some exemplary embodiments, referring to FIG. 2, the display panel 100 may further include a second substrate 120 disposed on the conductive structure layer 140, wherein the second substrate 120 protrudes from the first end surface of the first substrate 130, a protruding part of the second substrate 120 forms a second protruding part, and a second fixing adhesive 150 is filled between a side surface of the second protruding part facing the conductive structure layer 140 and the bent part 1402, to fix the bent part 1402 on the second substrate 120. The second fixing adhesive 150 may be UV adhesive, wherein the UV adhesive may be filled between one side surface of the bent part 1402 of the conductive structure layer 140 facing the second substrate 120 and the protruding part (i.e., the second protruding part) of the second substrate 120 after the conductive structure layer 140 is bent, and then cured by a UV lamp, so as to fix the side surface of the bent part 1402 of the conductive structure layer 140 facing the second substrate 120 on the second protruding part. The first fixing adhesive 160 and the second fixing adhesive 150 fix the two side surfaces of the bent part 1402 of the conductive structure layer 140, and serve a protective role.

In some exemplary embodiments, the display panel 100 may be a liquid crystal display panel or an OLED (Organic Light Emitting Diode) display panel. The first substrate 130 is an array substrate and the second substrate 120 is a color film substrate, when the display panel 100 is a liquid crystal display panel.

As shown in FIG. 2, another embodiment of the present application provides a display apparatus, which includes the display panel 100 described above and a backplate assembly 200 disposed on the side surface of the first substrate 130 away from the conductive structure layer 140, and the first protruding part is bent and then fixed on an end surface of the backplate assembly 200 corresponding to the first end face of the first substrate 130.

The display apparatus according to the embodiment of the present application may be a liquid crystal display apparatus or an OLED display apparatus. As the former, the display panel 100 is a liquid crystal display panel, and the backplate assembly 200 is a backlight assembly. As the latter, the display panel 100 is an OLED display panel, and the backplate assembly 200 is a back cover plate.

In some exemplary embodiments, referring to FIG. 2, the first protruding part is bent by 90 degrees toward the side surface of the first substrate 130 away from the conductive structure layer 140, and a part of the first protruding part corresponding to the end surface of the backplate assembly 200 may be fixed on the end surface of the backplate assembly 200 by an insulating double-sided tape 300. The rest of the first protruding part may be bent to the back side of the backplate assembly 200.

In some exemplary embodiments, the display apparatus further includes a driving chip 400 and an external circuit board 500 which are electrically connected with the bonding region 1401 of the conductive structure layer 140. The driving chip 400 may be attached on a part of the first protruding part opposite to the end surface of the backplate assembly 200, and the external circuit board 500 maybe a flexible printed circuit board and maybe attached to on a part of the first protruding part opposite to a back side of the backplate assembly 200.

In some exemplary embodiments, the display panel 100 may further include a first polarizer 170 disposed on a side of the first substrate 130 away from the second substrate 120 and a second polarizer 110 disposed on a side of the second substrate 120 away from the first substrate 130. A black matrix 121 is disposed on a side of the second substrate 120 facing the first substrate 130.

Referring to FIG. 2, taking a liquid crystal display apparatus as an example, the backplate assembly 200 is a backlight assembly. In some exemplary embodiments, the backlight assembly may include an adhesive bezel 210 attached to the back side of the first substrate 130, a backplate 250 forming a closed cavity with the adhesive bezel 210, a light strip 230 attached to a surface of the backplate 250 by a heat conductive tape 240, and a reflective sheet 270, a light guide plate 280 and an optical film 290 stacked in the closed cavity formed by the backplate 250 and the adhesive bezel 210. The reflective sheet 270 maybe attached to the surface of the backplate 250 by a double-sided tape 260. To narrow the bezel of the backlight assembly, the light strip 230 may be a COB (chip on board, encapsulating multiple LED chips on a substrate) light strip, which includes a light plate 231, a light emitting chip 232 and a flexible printed circuit board 233. One side surface of the light plate 231 is attached to the surface of the backplate 250 by the heat conductive tape 240, and the other side surface of the light plate 231 is attached to the adhesive bezel 210. A light shielding tape 220 is attached between the light plate 231 and the adhesive bezel 210, wherein the light shielding tape 220 is located at an edge of the optical film 290. For fixation and insulation, a part of the first protruding part being bent opposite to the end face of the backlight assembly is attached to the end surface of the backlight assembly by the insulating double-sided tape 300. The driving chip 400 and the external circuit board 500 are bonded to the conductive structure layer 140, and the rest of the first protruding part may be bent to the back side of the backlight assembly, so that the external circuit board 500 is completely located on the back side of the backlight assembly.

Referring to FIG. 2 to FIG. 15 and FIG. 22 to FIG. 23, another embodiment of the present application provides a method for manufacturing the display panel 100 of the above embodiment, which includes the following steps:

forming a conductive structure layer 140 on a side surface of a first substrate 130, wherein the conductive structure layer 140 has a bonding region 1401 close to a side edge thereof;

stripping at least a part of the bonding region 1401 from the first substrate 130;

cutting off the part of the first substrate 130 stripped from the conductive structure layer 140, and making a stripped part of the conductive structure layer 140 protrude from a cut end surface of the first substrate 130; and bending the stripped part of the conductive structure layer 140 toward a side of the first substrate 130 away from the conductive structure layer 140, and fixing a bent part 1402 of the conductive structure layer 140 on the cut end surface of the first substrate 130.

In the method for manufacturing the display panel according to the embodiment of the present application, the cut end surface of the first substrate 130 is the first end surface of the first substrate 130 in the above embodiment of the display apparatus including the display panel, and the stripped part of the conductive structure layer 140 is the first protruding part in the above embodiment of the display apparatus including the display panel.

With reference to FIG. 2 to FIG. 15 and FIG. 23, the method for manufacturing the display panel 100 according to the embodiment of the present application will be described in detail by way of example.

In S01, a display panel motherboard is manufactured.

A schematic structural diagram of the display panel motherboard is shown in FIG. 3, the display panel motherboard includes a first substrate 130 and a second substrate 120 which are oppositely disposed. A conductive structure layer 140 is formed on an upper surface of the first substrate 130, and the conductive structure layer 140 is located between the first substrate 130 and the second substrate 120 (i.e., the second substrate 120 is disposed on the conductive structure layer 140). An end surface of the first substrate 130 protrudes from a corresponding end surface of the second substrate 120. Accordingly, a bonding region 1401 of the conductive structure layer 140 close to a side edge thereof is exposed outside the second substrate 120 and located on a protruding part of the first substrate 130 with respect to the second substrate 120. The protruding part of the first substrate 130 with respect to the second substrate 120 is regarded as a removable bezel, and its length can be set according to actual requirements.

Referring to FIG. 3, the conductive structure layer 140 may include a base layer 141, a conductive layer 142, and a protective layer 143 which are sequentially stacked, wherein materials of the base layer 141 and the protective layer 143 both include an organic material. The conductive layer 142 is a metal layer. Organic materials are used for the base layer 141 and the protective layer 143 to ensure that the whole conductive structure layer 140 is flexible and bendable. The materials of the base layer 141 and the protective layer 143 may be organic materials such as polyimide (PI) and polyethylene terephthalate (PET). The bonding region 1401 of the conductive structure layer 140 is configured to be connected with electrical components, such as a driving chip 400 and an external circuit board 500.

In S02, the bonding region 1401 of the conductive structure layer 140 is stripped from the first substrate 130 and the second substrate 120.

Herein, a part of the conductive structure layer 140 stripped from the first substrate 130 is called a stripped part of the conductive structure layer 140, a part of the first substrate 130 stripped from conductive structure layer 140 is called a stripped part of the first substrate 130, and a part of the second substrate 120 stripped from conductive structure layer 140 is called a stripped part of the first substrate 130.

Figure 4:
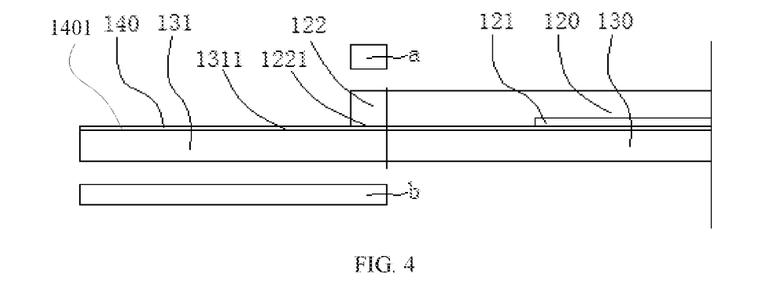
FIG. 4 is a schematic diagram showing a process of stripping the conductive structure layer of the display panel motherboard in FIG. 3 from a first substrate and a second substrate according to some exemplary embodiments.

In some exemplary embodiments, as shown in FIG. 4, the bonding region 1401 of the conductive structure layer 140 and a part of the conductive structure layer 140 close to the bonding region 1401 are irradiated by a laser b from the side of the first substrate 130 away from the conductive structure layer 140, so that a corresponding part of the conductive structure layer 140 is stripped from the first substrate 130. That is, the lower surface of a part 131 of the first substrate 130 stripped from the conductive structure layer 140 is irradiated by the laser b, so that a lower surface of the corresponding part of the conductive structure layer 140 and an upper surface 1311 of the stripped part 131 of the first substrate 130 are stripped from each other.

A part of the conductive structure layer 140 close to the bonding region 1401 is irradiated by a laser a from a side of the second substrate 120 away from the conductive structure layer 140, so that a corresponding part of the conductive structure layer 140 is stripped from the second substrate 120. That is, an upper surface of a part 122 of the second substrate 120 stripped from the conductive structure layer 140 is irradiated by a laser a above the second substrate 120, so that an upper surface of the corresponding part of the conductive structure layer 140 and a lower surface 1221 of the stripped part 122 of the second substrate 120 are stripped from each other.

In this way, the bonding region 1401 of the conductive structure layer 140 and the part of the conductive structure layer 140 close to the bonding region 1401 are stripped from both the first substrate 130 and the second substrate 120. The processes of stripping the conductive structure layer 140 from the first substrate 130 and the second substrate 120 may be performed sequentially or simultaneously, and the process of stripping the conductive structure layer 140 from the second substrate 120 may be performed before a subsequent bending operation on the conductive structure layer 140.

In S03, the stripped part 131 of the first substrate 130 is cut off.

Figure 5:
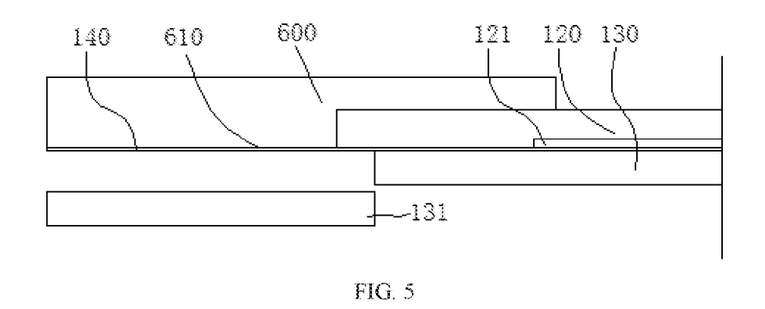
FIG. 5 is a schematic diagram showing a process of cutting off a part of the first substrate stripped from the conductive structure layer in FIG. 4 according to some exemplary embodiments.

In some exemplary embodiments, as shown in FIG. 5, an auxiliary fixture 600 is used to adsorb the upper surface of the stripped part of the conductive structure layer 140 on an adsorption surface 610, so as to position the stripped part of the conductive structure layer 140 and remain its position unchanged. Thereafter, the stripped part 131 of the first substrate 130 is cut off from the first substrate 130, so that the second substrate 120 protrudes from the cut end surface of the first substrate 130 and forms a protruding part (this protruding part is the second protruding part in the above embodiment of the display apparatus including the display panel). Among them, the cut surface from which the stripped part 131 of the first substrate 130 is cut off is the cut end surface of the first substrate 130.

Figure 6:
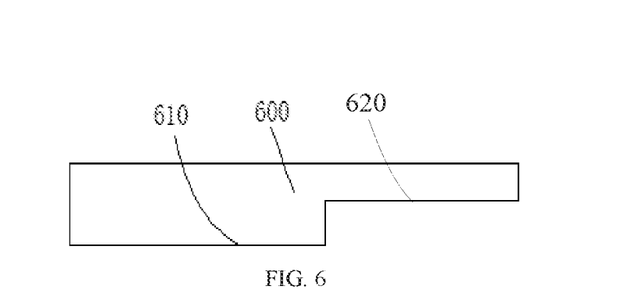
FIG. 6 is a schematic structural diagram of an auxiliary fixture used in FIG. 5 according to some exemplary embodiments.

In some exemplary embodiments, referring to FIG. 6, the auxiliary fixture 600 may have an adsorption surface 610 and a limiting surface 620, wherein interior of the auxiliary fixture 600 is provided with an evacuation pipeline, and the limiting surface 620 is L-shaped. In an adsorption operation, the limiting surface 620 is attached to the upper surface and an end surface of the second substrate 120, and the interior of the auxiliary fixture 600 is vacuumized, so that a negative pressure is generated on the adsorption surface 610, and the adsorption surface 610 adsorbs the upper surface of the stripped part of the conductive structure layer 140 under the action of the negative pressure. The limiting surface 620 may be configured to have a vacuum adsorption function, and can be adsorbed on the upper surface of the second substrate 120 in use, so as to position and fix the auxiliary fixture 600.

In S04, the stripped part of the conductive structure layer 140 is bent and fixed on the second substrate 120.

Figure 7:
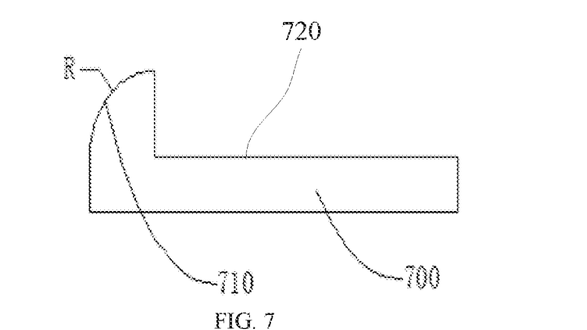
FIG. 7 is a schematic structural diagram of a first mold according to some exemplary embodiments.
Figure 8:
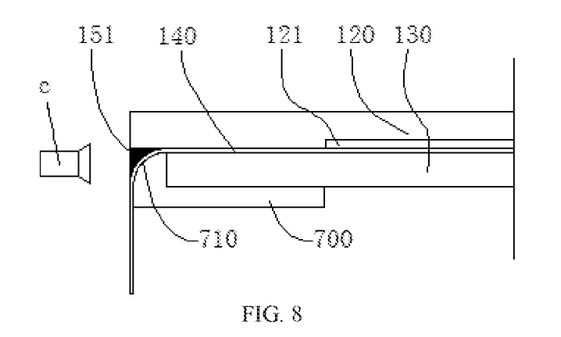
FIG. 8 is a schematic diagram showing a process of bending and fixing a conductive structure layer on a second substrate by using a first mold according to some exemplary embodiments.
Figure 10:
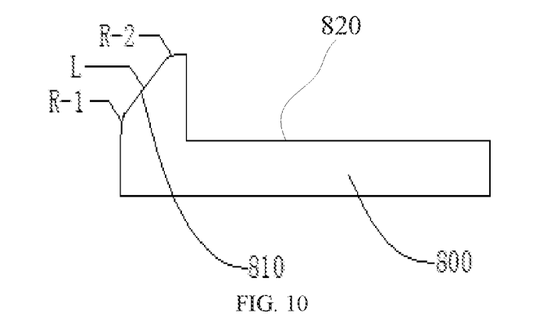
FIG. 10 is a schematic structural diagram of a second mold according to some exemplary embodiments.
Figure 11:
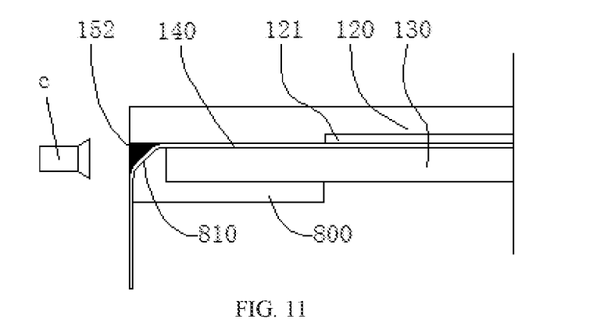
FIG. 11 is a schematic diagram showing a process of bending and fixing a conductive structure layer on a second substrate by using a second mold according to some exemplary embodiments.
Figure 13:
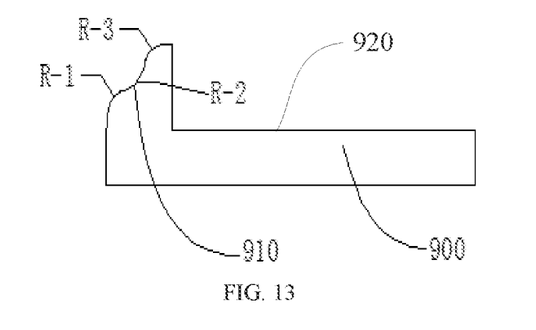
FIG. 13 is a schematic structural diagram of a third mold according to some exemplary embodiments.
Figure 14:
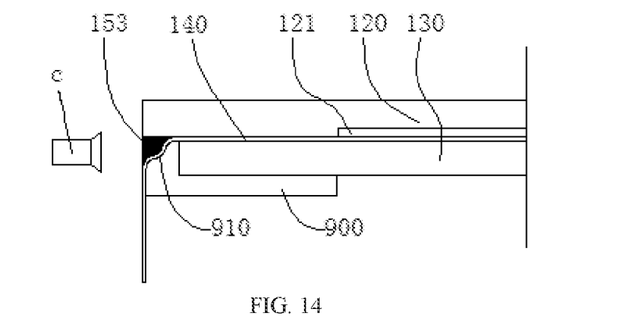
FIG. 14 is a schematic diagram showing a process of bending and fixing a conductive structure layer on a second substrate by using a third mold according to some exemplary embodiments.

In this step S04, the embodiment of the present application provides three examples, of which FIG. 7 to FIG. 9 are the first example, FIG. 10 to FIG. 12 are the second example, and FIG. 13 to FIG. 15 are the third example. Molds used in the three examples are different, but the process methods thereof are the same. In this step S04, the first example shown in FIG. 7 to FIG. 9 is taken as an example for description.

In some exemplary embodiments, referring to FIG. 8 (or FIG. 11, FIG. 14), a first mold 700 as shown in FIG. 7 (a mold 800 shown in FIG. 10, a mold 900 shown in FIG. 13) is placed on the cut end surface of the first substrate 130, in a case where the stripped part of the conductive structure layer 140 is still adsorbed by the auxiliary fixture 600 to remain its position unchanged.

In some exemplary embodiments, referring to FIG. 7, the first mold 700 may be L-shaped as a whole, and the first mold 700 has a molding surface 710 for smoothly bending the bent part 1402 of the conductive structure layer 140 by 90 degrees, and also has a limiting surface 720. A vacuumizing pipeline is provided inside the first mold 700 to generate an adsorption force on the molding surface 710 for adsorbing a lower surface of the bent part 1402 of the conductive structure layer 140.

The limiting surface 720 of the first mold 700 is L-shaped and attached to the cut end surface of the first substrate 130 and a side surface of the first substrate 130 away from the conductive structure layer 140 (i.e., a lower surface in FIG. 8), so that the molding surface 710 is smoothly butted with a side surface of the first substrate 130 on which the conductive structure layer 140 is formed (i.e., an upper surface in FIG. 8).

The auxiliary fixture 600 stops adsorption, attaches a lower surface of the stripped part of the conductive structure layer 140 onto the molding surface 710 for smooth bending and turning of 90 degree, and vacuumizes the inside of the first mold 700 to generate a negative pressure on the molding surface 710. Under the action of the negative pressure, the lower surface of the bent part 1402 of the conductive structure layer 140 is adsorbed on the molding surface 710.

In some exemplary embodiments, referring to FIG. 8, a second fixing adhesive 151 (A second fixing adhesive 152 in FIG. 11 and a second fixing adhesive 153 in FIG. 14) is filled between an upper surface of the bent part 1402 of the conductive structure layer 140 and the protruding part of the second substrate 120, wherein the second fixing adhesive 151 may be UV adhesive, which is irradiated and cured by a UV lamp c after being filled. The upper surface of the bent part 1402 of the conductive structure layer 140 is fixed onto the second substrate 120. The shape of the bent part 1402 of the conductive structure layer 140 is consistent with the shape of the molding surface 710 of the first mold 700.

In some exemplary embodiments, the molds of the three examples as shown in FIG. 7, FIG. 10, and FIG. 13 may be L-shaped as a whole, and have molding surfaces and limiting surfaces, wherein the limiting surfaces (the limiting surface 720 of the first mold 700, a limiting surface 820 of a second mold 800, and a limiting surface 920 of a third mold 900) may be attached to the cut end surface of the first substrate 130 and the lower surface of the first substrate 130, to achieve accurate positioning of the placement position of the molds. The molding surfaces (the molding surface 710 of the first mold 700, a molding surface 810 of the second mold 800, and a molding surface 910 of the third mold 900) are used to allow smooth transition of the bent part 1402 of the conductive structure layer 140. A vacuumizing pipeline is provided inside each mold for generating an adsorption force on the molding surface, so that the bent part 1402 of the conductive structure layer 140 is firmly and tightly attached to the molding surface, and the shape of the bent part 1402 of the conductive structure layer 140 is consistent with the shape of the molding surface. The limiting surface of each mold may be set to have a vacuum adsorption function, so that the whole mold can be adsorbed and fixed on the first substrate 130, and no additional device for fixing the mold is needed.

FIG. 7 is a schematic structural diagram of the first mold 700, and FIG. 8 and FIG. 9 are process flow charts of using the first mold 700. In some exemplary embodiments, the shape of the molding surface 710 of the first mold 700 is an arc surface, which may be ¼ of an arc surface with the same radius R or ¼ elliptical arc surface.

FIG. 10 is a schematic structural diagram of the second mold 800, and FIG. 11 and FIG. 12 are process flow charts of using the second mold 800. In some exemplary embodiments, the shape of the molding surface 810 of the second mold 800 is a curved surface including an arc surface (radius of which is R-2), an inclined surface (length of which is L) and an arc surface (radius of which is R-1) which are sequentially connected, wherein the inclined surface in the middle may be tangent to the arc surfaces at two ends, the arc surfaces at the two ends may be circular arc surfaces or elliptical arc surfaces, and there may be multiple or many kinds of arc surfaces on the molding surface. The shape of the molding surface of the mold is beneficial to the smooth transition of the conductive structure layer 140 and reduction of the deformation stress of the conductive layer 142 inside the conductive structure layer 140, and thus the life of the conductive structure layer 140 is improved.

FIG. 13 is a schematic structural diagram of the third mold 900, and FIG. 14 and FIG. 15 are process flow charts of using the third mold 900. In some exemplary embodiments, the shape of the molding surface 910 of the third mold 900 is a wavy curved surface, which may include for example three curved surfaces of different curving directions which are smoothly connected with each other, and the radii of the three curved surfaces may be different, namely R-1, R-2 and R-3. The wavy curved surface can increase the smooth transition of the bent part 1402 of the conductive structure layer 140, and effectively increase the length of the bent part 1402 of the conductive structure layer 140, which is beneficial to reducing the deformation stress of the conductive layer 142 inside the conductive structure layer 140, thus improving the life of the conductive structure layer 140.

The first mold 700, the second mold 800 and the third mold 900 of the three examples have different shapes of molding surfaces, other structures of them may be the same, and arrangement of the three molds in the three examples may be the same.

In this step S04, the conductive structure layer 140 is smoothly bent by 90 degrees by using the molding surface of the mold, so as to avoid a risk that the base layer 141 of the conductive structure layer 140 being punctured by an edge of the cut end surface of the first substrate 130 during bending, and a risk of fracture of the internal conductive layer 142.

In S05, the bent part 1402 of the conductive structure layer 140 is fixed on the first substrate 130.

In some exemplary embodiments, as shown in FIG. 9 (FIG. 12 and FIG. 15), after the second fixing adhesive 151 (a second fixing adhesive 152 in FIG. 11 and a second fixing adhesive 153 in FIG. 14) between the bent part 1402 of the conductive structure layer 140 and the protruding part of the second substrate 120 is cured, the first mold 700 (the second mold 800 and the third mold 900) is removed, and a first fixing adhesive 161 (a first fixing adhesive 162 in FIG. 12 and a first fixing adhesive 163 in FIG. 15) is filled between the lower surface of the bent part 1402 of the conductive structure layer 140 and the cut end surface of the first substrate 130. The first fixing adhesive 161 may be UV adhesive, which is cured by irradiation using a UV lamp d after being filled, and after being cured, the first fixing adhesive fix the lower surface of the bent part 1402 of the conductive structure layer 140 on the cut end surface of the first substrate 130. So far, the upper surface and the lower surface of the bent part 1402 of the conductive structure layer 140 are fixed on the second substrate 120 and the first substrate 130, respectively, thereby completing the fixation and protection of the bent part 1402.

In some exemplary embodiments, the method for manufacturing the display panel may further include a step of bonding electrical components, that is, a step of bonding a driving chip 400 and an external circuit board 500 in the bonding region 1401 of the conductive structure layer 140. The bonding step may be between the above steps S03 and S04, that is, after cutting off the stripped part 131 of the first substrate 130, the lower surface of the stripped part of the conductive structure layer 140 is absorbed by another auxiliary fixture (which has a similar structure as the auxiliary fixture 600, and has an adsorption surface and a limiting surface, the limiting surface is attached and adsorbed on the lower surface and the cut end surface of the first substrate 130, and the adsorption surface adsorbs the conductive structure layer 140 with a negative pressure) to maintain its position unchanged. Then the driving chip 400 and the external circuit board 500 are bonded on the upper surface of the stripped part (i.e., the bonding region 1401) of the conductive structure layer 140 by using a bonding process. Thereafter, the bending operation of the conductive structure layer 140 is performed.

Referring to FIG. 2, after the display panel 100 manufactured in the embodiment of the present application is assembled with the backplate assembly 200, the stripped part of the conductive structure layer 140 (including the bonding region 1401, at this time, the bending is completed and the bent part 1402 has been fixed using the fixing adhesive) may be fixed on the end surface of the backplate assembly 200 corresponding to the cut end face of the first substrate 130 by using an insulating double-sided tap 300 for fixation and protection, and finally the display apparatus with a narrow bezel shown in FIG. 2 is obtained. Referring to FIG. 1, compared with some display apparatuses, the bezel width of the display apparatus in the embodiment of the present application is reduced to less than ⅓, and the bezel width of the display apparatus in the embodiment of the present application is significantly narrower than those of some display apparatuses.

In some exemplary embodiments, according to an embodiment of the present application, with process technologies, e.g., the base layer 141 and the protective layer 143 made of organic materials such as PI are disposed in the display panel 100 to carry the conductive layer 142 and form the flexible and bendable conductive structure layer 140, the bonding region 1401 of the conductive structure layer 140 is stripped from the first substrate 130 and the second substrate 120 by laser, the stripped part of the conductive structure layer 140 is positioned by an auxiliary fixture, the stripped part of the first substrate 130 is cut off, and the bent part 1402 of the conductive structure layer 140 is shaped and protected by the fixing adhesive, etc., so that the bezel on the external circuit side of the display panel 100 is narrowed. The driving chip 400 and the external circuit board 500 are directly bonded on the conductive structure layer 140, so that use of COF technology is reduced. The ultra-narrow bezel backlight design and the shaping and protection of the bonding region 1401 of the conductive structure layer 140 are adopted, thus achieving the technical effects of simplifying the processes, reducing the costs, greatly reducing the bezel on the external circuit side of the display panel 100 to achieve narrow bezel at four sides, and solving the problems of the damage risk of the base layer 141 and the fracture risk of the internal conductive layer 142.

As shown in FIG. 16 to FIG. 22, another embodiment of the present application provides a method for manufacturing a display panel without a second substrate 120, which includes the following steps:

In S1, a conductive structure layer 140 is formed on a side surface of a first substrate 130, wherein the conductive structure layer 140 has a bonding region 1401 close to a side edge thereof.

In S2, at least a part of the bonding region 1401 is stripped from the first substrate 130.

In S3, a part of the first substrate 130 stripped from the conductive structure layer 140 is cut off, and a stripped part of the conductive structure layer 140 protrudes from a cut end surface of the first substrate 130.

In S4, the stripped part of the conductive structure layer 140 is bent toward a side of the first substrate 130 away from the conductive structure layer 140, and a bent part 1402 of the conductive structure layer 140 is fixed on the cut end surface of the first substrate 130.

Figure 16:
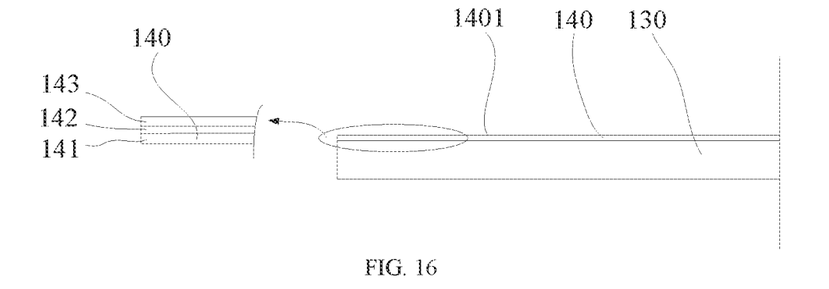
FIG. 16 is a schematic diagram showing a process of forming a conductive structure layer on a first substrate and a schematic structure diagram of a conductive structure layer on the first substrate in a method for manufacturing a display panel according to other exemplary embodiments.

In some exemplary embodiments, as shown in FIG. 16, in step S1, the structure of the conductive structure layer 140 can be referred to above.

Figure 17:
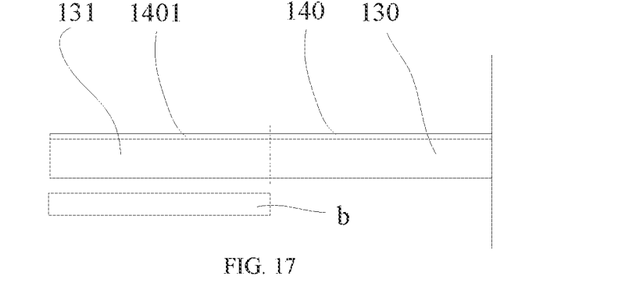
FIG. 17 is a schematic diagram showing a process of stripping a bonding region of the conductive structure layer in FIG. 16 from the first substrate according to some exemplary embodiments.

In some exemplary embodiments, as shown in FIG. 17, step S2 may include irradiating the bonding region 1401 of the conductive structure layer 140 by using laser b from the side of the first substrate 130 away from the conductive structure layer 140 (the lower surface of the first substrate 130 in FIG. 17), i.e., irradiating a lower surface of the stripped part 131 of the first substrate 130 to make an upper surface of the stripped part 131 of the first substrate 130 and a corresponding part of the conductive structure layer 140 stripped from each other, so that the corresponding part of the conductive structure layer 140 is stripped from the first substrate 130.

Figure 18:
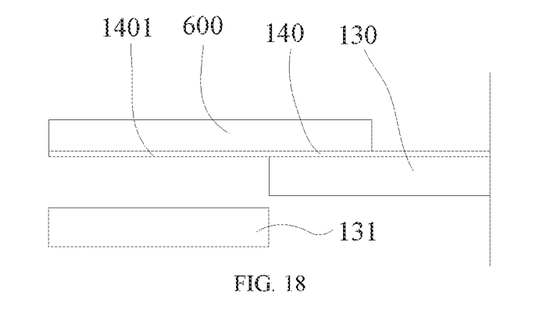
FIG. 18 is a schematic diagram showing a process of cutting off a part of the first substrate stripped from the conductive structure layer in FIG. 17 according to some exemplary embodiments.

In some exemplary embodiments, as shown in FIG. 18, in step S3, the cutting off the part 131 of the first substrate 130 stripped from the conductive structure layer 140 may include: positioning the stripped part (including the bonding region 1401) of the conductive structure layer 140 by using an auxiliary fixture 600, and then cutting off the part 131 of the first substrate 130 stripped from the conductive structure layer 140. Among them, the cut end surface from which the stripped part 131 of the first substrate 130 is cut off is the cut end surface of the first substrate 130.

The auxiliary fixture 600 may be a vacuum adsorption fixture with an adsorption plane, which is attached and adsorbed on a side surface (the upper surface of the first substrate 130 in FIG. 18) of the first substrate 130 where the conductive structure layer 140 is formed, and the upper surface of the stripped part of the conductive structure layer 140 is absorbed, thereby the stripped part of the conductive structure layer 140 is positioned, that is, the position of the stripped part of the conductive structure layer 140 is maintained to be unchanged with respect to the first substrate 130.

Figure 19:
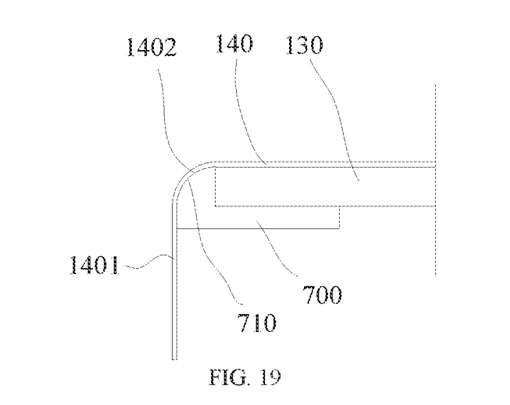
FIG. 19 is a schematic diagram showing a process of bending the stripped part of the conductive structure layer in FIG. 18 according to some exemplary embodiments.

In some exemplary embodiments, as shown in FIG. 19, step S4 may include: disposing a mold 700 shown in FIG. 7 on the cut end surface of the first substrate 130 (the structure of the mold 700 is described above), and attaching the stripped part of the conductive structure layer 140 on a molding surface 710 of the mold 700 for a 90 degree smooth bending.

Figure 20:
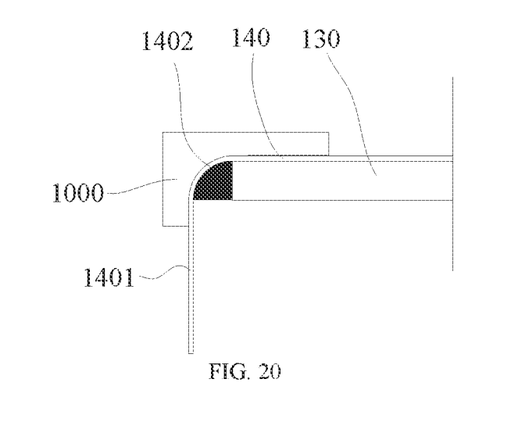
FIG. 20 is a schematic diagram showing a process of fixing a bent part of the conductive structure layer on the first substrate in FIG. 19 according to some exemplary embodiments.
Figure 21:
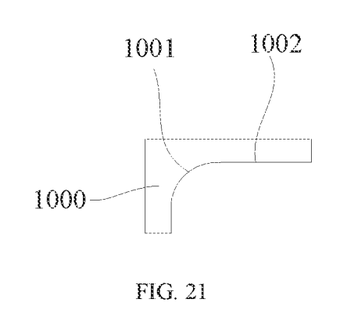
FIG. 21 is a schematic structural diagram of an auxiliary fixture in FIG. 20 according to some exemplary embodiments.
Figure 22:
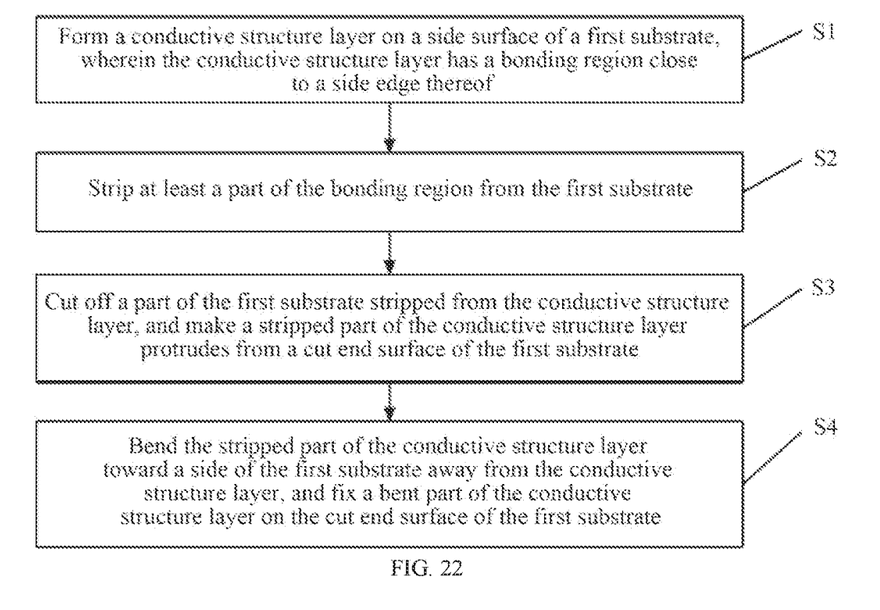
FIG. 22 is a schematic flow chart of a method for manufacturing a display panel according to some exemplary embodiments.
Figure 23:
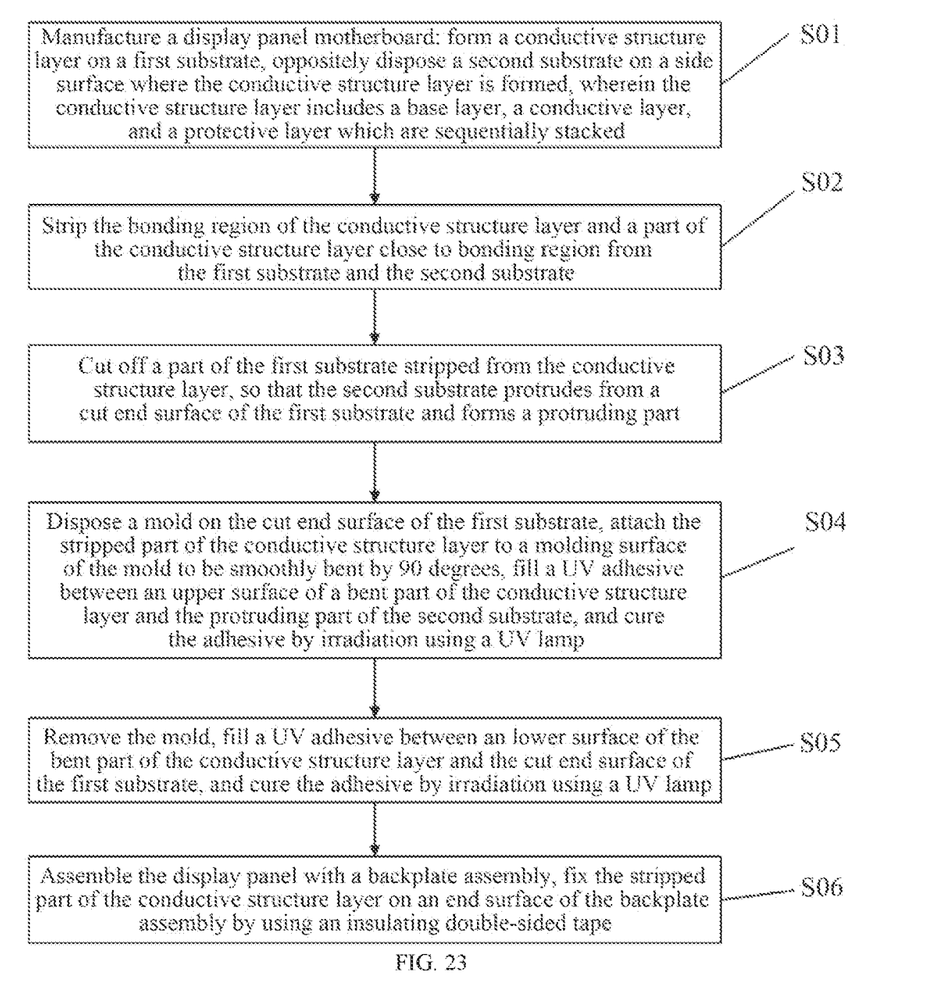
FIG. 23 is a schematic flow chart of a method for manufacturing a display apparatus according to some exemplary embodiments.

In some exemplary embodiments, as shown in FIG. 20, after the bending, an auxiliary fixture 1000 shown in FIG. 21 is used to position the stripped part (which may be the bent part 1402 of the conductive structure layer 140) of the conductive structure layer 140. Referring to FIG. 21, the auxiliary fixture 1000 has an adsorption surface 1001 and a limiting surface 1002, and has a vacuumizing pipeline inside for generating a negative pressure adsorption force on the adsorption surface 1001 and the limiting surface 1002. During operation, the limiting surface 1002 is attached and adsorbed on the upper surface of the first substrate 130, and the adsorption surface 1001 adsorbs and positions the bent part 1402 of the conductive structure layer 140 in a bent state.

Then, the mold 700 is removed, and a first fixing adhesive 161 is filled between the bent part 1402 of the conductive structure layer 140 and the cut end surface of the first substrate 130 to fix the bent part 1402 of the conductive structure layer 140 on the cut end surface of the first substrate 130.

Other operations of the embodiments of the present application may be the same as the embodiments of the above-mentioned method for manufacturing the display panel.

In the description herein, unless otherwise explicitly specified and defined, the terms "connection", "direct connection", "indirect connection", "fixed connection", "installation" and "assembly" are to be understood broadly, for example, a connection may be a fixed connection, or may be a detachable connection, or an integrated connection. The terms "installation", "connection" and "fixed connection" may refer to a direct connection, or an indirect connection through an intermediate medium, or an internal connection between two elements. Those of ordinary skill in the art can understand the specific meanings of the above mentioned terms herein.

What is claimed is:

1. A display panel, comprising:
    a first substrate, wherein a conductive structure layer is formed on a side surface of the first substrate, the conductive structure layer has a bonding region close to a side edge of the conductive structure layer, the bonding region of the conductive structure layer protrudes from a first end surface of the first substrate, a protruding part of the conductive structure layer forms a first protruding part, the first protruding part is bent toward a side of the first substrate away from the conductive structure layer, and a bent part of the first protruding part is fixed on the first end surface of the first substrate, wherein a first fixing adhesive is filled between the bent part and the first end surface of the first substrate; and
    a second substrate, which is disposed on the conductive structure layer, wherein the second substrate protrudes from the first end surface of the first substrate and a protruding part of the second substrate forms a second protruding part, and a second fixing adhesive is filled between a side surface of the second protruding part facing the conductive structure layer and the bent part.

2. The display panel according to claim 1, wherein a shape of the bent part is an arc surface, a wavy curved surface, or a curved surface comprising an arc surface, an inclined surface and an arc surface which are sequentially connected.

3. The display panel according to claim 1, wherein the conductive structure layer comprises a base layer, a conductive layer and a protective layer which are sequentially stacked, and materials of the base layer and the protective layer both comprise polyimide or polyethylene terephthalate.

4. A display apparatus comprising the display panel according to claim 1 and a backplate assembly disposed on a side surface of the first substrate away from the conductive structure layer, wherein the first protruding part is fixed on an end surface of the backplate assembly corresponding to the first end surface of the first substrate after being bent.

5. A method for manufacturing a display panel, comprising the following steps:
    the step of forming a conductive structure layer on a side surface of a first substrate, wherein the conductive structure layer has a bonding region close to a side edge of the conductive structure layer;
    the step of stripping at least a part of the bonding region from the first substrate wherein the step further comprises: disposing a second substrate on the conductive structure layer, to make the bonding region be exposed outside the second substrate; irradiating the bonding region of the conductive structure layer and a part of the conductive structure layer close to the bonding region from the side of the first substrate away from the conductive structure layer by using laser, to strip a corresponding part of the conductive structure layer from the first substrate; and irradiating the part of the conductive structure layer close to the bonding region from a side of the second substrate away from the conductive structure layer by using laser, to strip a corresponding part of the conductive structure layer from the second substrate;

the step of the cutting off a part of the first substrate stripped from the conductive structure layers and making a stripped part of the conductive structure layer protrude from a cut end surface of the first substrate, wherein the cutting off the part of the first substrate stripped from the conductive structure layer further comprises: positioning the stripped part of the conductive structure layer from a side where the second substrate is located by using an auxiliary fixture; and cutting off the part of the first substrate stripped from the conductive structure layer, wherein the second substrate protrudes from the cut end surface of the first substrate to form a protruding part; and the step of bending the stripped part of the conductive structure layer toward a side of the first substrate away from the conductive structure layers and fixing a bent part of the conductive structure layer on the cut end surface of the first substrate, wherein the step further comprises: disposing a mold on the cut end surface of the first substrate, wherein the mold has a molding surface allowing smooth transition of the bent part of the conductive structure layer; attaching the stripped part of the conductive structure layer on the molding surface to be bent filling a second fixing adhesive between the bent part of the conductive structure layer and the protruding part of the second substrate, and curing the second fixing adhesive; and removing the mold, filling a first fixing adhesive between the bent part of the conductive structure layer and the cut end surface of the first substrate, and curing the first fixing adhesive.

6. The method for manufacturing the display panel according to claim 5, wherein the stripping at least a part of the bonding region from the first substrate comprises:

irradiating the bonding region of the conductive structure layer from the side of the first substrate away from the conductive structure layer by using laser, to strip a corresponding part of the conductive structure layer from the first substrate.

7. The method for manufacturing the display panel according to claim 5, wherein the cutting off the part of the first substrate stripped from the conductive structure layer comprises:

positioning the stripped part of the conductive structure layer by using an auxiliary fixture; and cutting off the part of the first substrate stripped from the conductive structure layer.

8. The method for manufacturing the display panel according to claim 5, wherein the mold has the molding surface and a limiting surface, and the disposing the mold on the cut end surface of the first substrate comprises: attaching the limiting surface of the mold to the cut end surface of the first substrate and the side surface of the first substrate away from the conductive structure layer, to make the molding surface be smoothly butted with the side surface of the first substrate on which the conductive structure layer is formed.

* * * * *

UNITED STATES PATENT AND TRADEMARK OFFICE
CERTIFICATE OF CORRECTION

PATENT NO. : 11,686,962 B2
APPLICATION NO. : 17/288535
DATED : June 27, 2023
INVENTOR(S) : Zhongbao Wu et al.

It is certified that error appears in the above-identified patent and that said Letters Patent is hereby corrected as shown below:

On the Title Page

The PCT filing date should be Aug. 31, 2020.

Signed and Sealed this
Twelfth Day of September, 2023

Katherine Kelly Vidal
*Director of the United States Patent and Trademark Office*